(12) United States Patent
Issler et al.

(10) Patent No.: US 8,631,315 B2
(45) Date of Patent: Jan. 14, 2014

(54) SYSTEM AND METHOD FOR DELIVERING INFORMATION RELATED TO A PRODUCT

(75) Inventors: James E. Issler, Greenwich, CT (US); Djordje Filipovic, New York, NY (US)

(73) Assignee: Columbia Insurance Company, Omaha, NE (US)

( * ) Notice: Subject to any disclaimer, the term of this patent is extended or adjusted under 35 U.S.C. 154(b) by 1257 days.

(21) Appl. No.: 11/750,033

(22) Filed: May 17, 2007

(65) Prior Publication Data
US 2008/0288855 A1  Nov. 20, 2008

(51) Int. Cl.
*G06F 17/00* (2006.01)
*G06F 3/048* (2013.01)

(52) U.S. Cl.
USPC .......................................... 715/205; 715/825

(58) Field of Classification Search
USPC .................. 715/205–208, 234, 975, 808, 825
See application file for complete search history.

(56) References Cited

U.S. PATENT DOCUMENTS

| | | | |
|---|---|---|---|
| 6,373,502 B1 * | 4/2002 | Nielsen ......................... | 715/708 |
| 7,047,487 B1 * | 5/2006 | Bates et al. ................... | 715/234 |
| 7,107,226 B1 * | 9/2006 | Cassidy et al. ................. | 705/26 |
| 7,254,581 B2 * | 8/2007 | Johnson et al. ........................ | 1/1 |
| 7,559,034 B1 * | 7/2009 | Paperny et al. ............... | 715/803 |
| 7,814,425 B1 * | 10/2010 | O'Shaugnessy et al. ..... | 715/752 |
| 7,975,020 B1 * | 7/2011 | Green et al. ................... | 709/217 |
| 2002/0129114 A1 * | 9/2002 | Sundaresan et al. .......... | 709/213 |
| 2004/0100498 A1 * | 5/2004 | Dietz et al. .................... | 345/760 |
| 2004/0119727 A1 * | 6/2004 | Dietz et al. .................... | 345/629 |
| 2004/0255240 A1 * | 12/2004 | Udom et al. ................... | 715/506 |
| 2006/0005148 A1 * | 1/2006 | Cheng et al. .................. | 715/808 |
| 2007/0260677 A1 * | 11/2007 | DeMarco et al. ............. | 709/203 |
| 2008/0155060 A1 * | 6/2008 | Weber et al. .................. | 709/218 |
| 2008/0165133 A1 * | 7/2008 | Blumenberg et al. ......... | 345/173 |
| 2008/0209311 A1 * | 8/2008 | Agronik et al. ............... | 715/234 |
| 2009/0164949 A1 * | 6/2009 | Henkin et al. ................. | 715/862 |
| 2010/0146380 A1 * | 6/2010 | Rousso et al. ................. | 715/234 |
| 2010/0153831 A1 * | 6/2010 | Beaton .......................... | 715/201 |
| 2012/0151308 A1 * | 6/2012 | Falkenberg et al. .......... | 715/201 |

* cited by examiner

*Primary Examiner* — Manglesh M Patel
(74) *Attorney, Agent, or Firm* — IP Attorneys Group, LLC

(57) ABSTRACT

The invention relates to a system for delivering information related to a product, including a computer, a webpage displayed on the computer that is directed to the product, a program executing on the computer for placing an overlay over the webpage where at least one portion of the overlay is generally transparent, and a program executing on the computer for displaying a plurality of hyperlinks on the overlay, each hyperlink indicating a different characteristic of the product. The invention also includes a program executing on the computer for, when a hyperlink is actuated, automatically displaying a sample and a menu of other samples of a characteristic of the actuated hyperlink.

24 Claims, 22 Drawing Sheets

SYSTEM AND METHOD FOR DELIVERING INFORMATION RELATED TO A PRODUCT

FIELD OF THE INVENTION

The invention relates to a navigation tool.

BACKGROUND OF THE INVENTION

Some consumers order products or services through the internet because it is convenient and it saves time as opposed to traveling to and from a store. Other consumers may find the selection is more abundant at an internet site since a site may carry numerous brands and varieties of a single product, such as a shoe, whereas a store may be limited due to space availability or costs associated with having a large inventory of products. Moreover, consumers may find a wealth of information about products or services not found at a store, such as customer reviews, demonstrations of a product, and competing stores' prices.

Further, merchants may find advertising on the internet to be advantageous because of its low cost relative to advertisements on other media, such as radio, television, or printed ads. Advertisements on the internet also have the ability to reach many more consumers than traditional advertisements.

However, in order to access this information, a consumer may encounter several obstacles that may discourage the consumer from proceeding, thereby negating any benefits from advertising on the internet. A typical obstacle may be difficulty in finding the information. Another obstacle may be requiring the consumer navigate through numerous webpages in order to get to the information. A further obstacle may be insufficient information on each webpage, particularly when comparison shopping, which often results in the consumer flipping back and forth between two webpages. In a more unfortunate event, such problems may lead to a lost customer if the customer chooses not to visit the website again. Hence, an improved process for delivering information about products or services may alleviate the above problems.

What is desired, therefore, is a program that facilitates navigating a website. Another desire is a program that provides information quickly and easily. A further desire is a program that provides a greater amount of information about a product and competing products while using fewer webpages or with less navigation.

SUMMARY OF THE INVENTION

It is therefore an object of the invention to place a selection of menu options on a webpage from which a user can choose in order to have information directed to the selection appear on the webpage without covering the menu of options so that a user can make another selection without flipping to a previous webpage, thereby facilitating the delivery of information to the user.

It is another object to provide a program that executes on a computer for delivering information directed to a selection of the user next to information directed to other selections.

A further object of the invention is to provide various vehicles, such as video, imaging, descriptions, and the like, for delivering the information selected by the user and where the user also selects the vehicle.

These and other objects of the invention are achieved by a system for delivering information related to a product, including a computer, a webpage displayed on the computer that is directed to the product, a program executing on the computer for placing an overlay over the webpage where at least one portion of the overlay is generally transparent, and a program executing on the computer for displaying a plurality of hyperlinks on the overlay, each hyperlink indicating a different characteristic of the product. The invention also includes a program executing on the computer for, when a hyperlink is actuated, automatically displaying a sample and a menu of other samples of a characteristic of the actuated hyperlink.

In some embodiments, the sample is a video of the product and the menu of samples is a plurality of videos of other products. In other embodiments, the sample is an image of the product and the menu of samples is a plurality of images of other products. In further embodiments, the image is selected from the group consisting of a texture, close-up, an accessory, a bottom view, a color, a construction, and combinations thereof.

In another embodiment, the sample is a list of components and the menu of samples is a plurality of lists of components. In yet another embodiment, the sample is an accessory and the menu of samples is a plurality of accessories.

In some embodiments, the sample is a process of construction of the product and the menu of samples is a plurality of processes of constructions of other products. In other embodiments, the sample is a category of the product and the menu of samples is a plurality of categories of other products.

In a further embodiment, the sample is comparative information of the product and at least a second product and the menu of samples is comparative information of a plurality of other products.

Optionally, the system further includes a program executing on the computer for, when at least a first hyperlink is actuated, displaying a video and a menu of other videos; a program executing on the computer for, when at least a second hyperlink is actuated, displaying an image and a menu of other images; and a program executing on the computer for, when at least a third hyperlink is actuated, displaying comparative information and a menu of other comparative information.

In another aspect of the invention, a system for delivering information related to a product includes a computer, a webpage displayed on the computer that is directed to the product, a program executing on the computer for placing an overlay over the webpage where at least one portion of the overlay is generally transparent, and a program executing on the computer for displaying a plurality of hyperlinks on the overlay, each hyperlink indicating a different characteristic of the product. The system also includes a program executing on the computer for, when a hyperlink is actuated, automatically displaying information related to the characteristic of the actuated hyperlink on the overlay proximate to a remainder of the plurality of the hyperlinks.

In some embodiments, the characteristic is based on a type of material, a type of construction, a color, a use, and combinations thereof. In other embodiments, one of a plurality of hyperlinks, when actuated, launches a second program that executes on the computer for placing a second overlay over the webpage. This second program can execute to automatically play a video.

In other embodiments, the program executing on the computer automatically displays, when one of a plurality of hyperlinks is actuated, a demonstration of how the product is provided. In an optional embodiment, the program executing on the computer automatically displays, when one of a plurality of hyperlinks is actuated, an image of the product. In another embodiment, the program executing on the computer automatically displays, when one of a plurality of hyperlinks is actuated, comparative information between the product and at least one competing product.

In another aspect of the invention, a system for delivering information related to a product includes a computer, at least three hyperlinks related to the product displayed on the computer, and a program executing on the computer for, when at least a first hyperlink is actuated, displaying a video and a menu of other videos. The system also includes a program executing on the computer for, when at least a second hyperlink is actuated, displaying an image and a menu of other images and a program executing on the computer for, when at least a third hyperlink is actuated, displaying comparative information and a menu of other comparative information.

In some embodiments, the menu of videos prompts a program to execute on the computer for automatically listing a plurality of videos from which a user may select.

DETAILED DESCRIPTION

Figure 1:
FIG. 1 depicts the prompt for actuating the system shown in FIG. 2.

As shown in FIG. 1, webpage 20 is displayed on a computer screen, where webpage 20 shows information related to a product, including advertisements. As shown, product 22 is a shoe. System 40 for delivering information related to product 22 is actuated by prompt 28, which is a hyperlink or graphically selectable electronic button.

Figure 2:
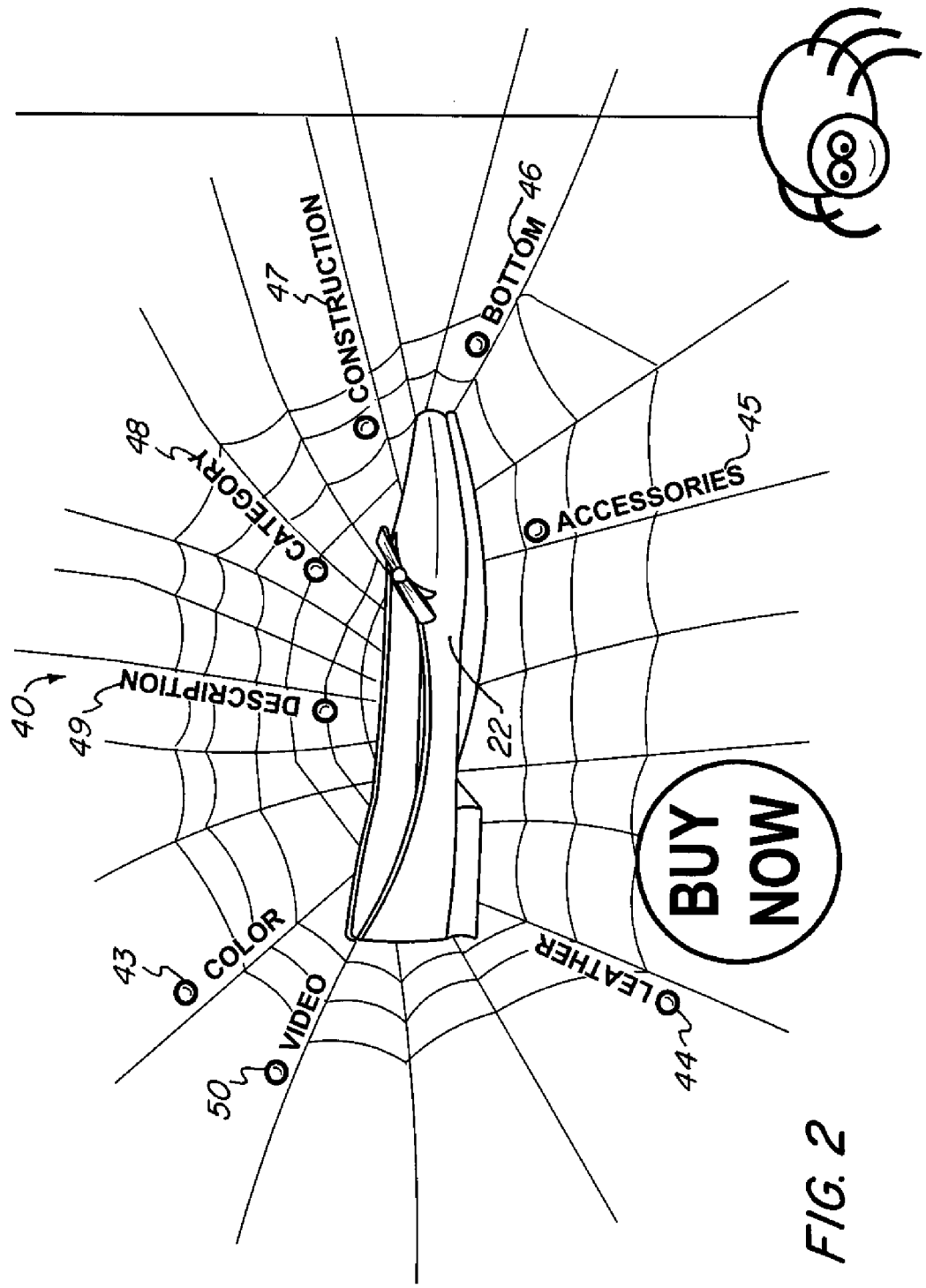
FIG. 2 depicts the system in accordance with the invention.

When actuated, prompt 28 launches system 40 as shown in FIG. 2 by displaying plurality 42 of hyperlinks on top of overlay 56, which is transparent in at least one portion, and where plurality 42 of hyperlinks are individually numbered 43-50. Overlay 56 is any structure, layer, or electronic sheet placed over webpage 20 and acts as a platform onto which plurality 42 of hyperlinks and other information are placed. In some embodiments, overlay 56 is another webpage. In further embodiments, overlay 56 is a part of webpage 20. Although eight hyperlinks are shown in plurality 42 of hyperlinks, further embodiments have any number of hyperlinks and the number of hyperlinks making up plurality 42 of hyperlinks should not be interpreted to be a limitation of the invention.

As described herein, each hyperlink of plurality 42 of hyperlinks represent a characteristic of product 22. As shown, each hyperlink or characteristic is different than a next hyperlink or characteristic even though all hyperlinks are related to product 22. In further embodiments, each characteristic or hyperlink relates to differing products, such as one hyperlink or characteristic being related to one product and a next hyperlink or characteristic being related to another product. Moreover, each sample and menu described below relates to a characteristic and other characteristics, respectively, of the same product 22. In further embodiments, each sample and menu of samples below relates to a characteristic and other characteristics, respectively, of varying products.

Figure 3:
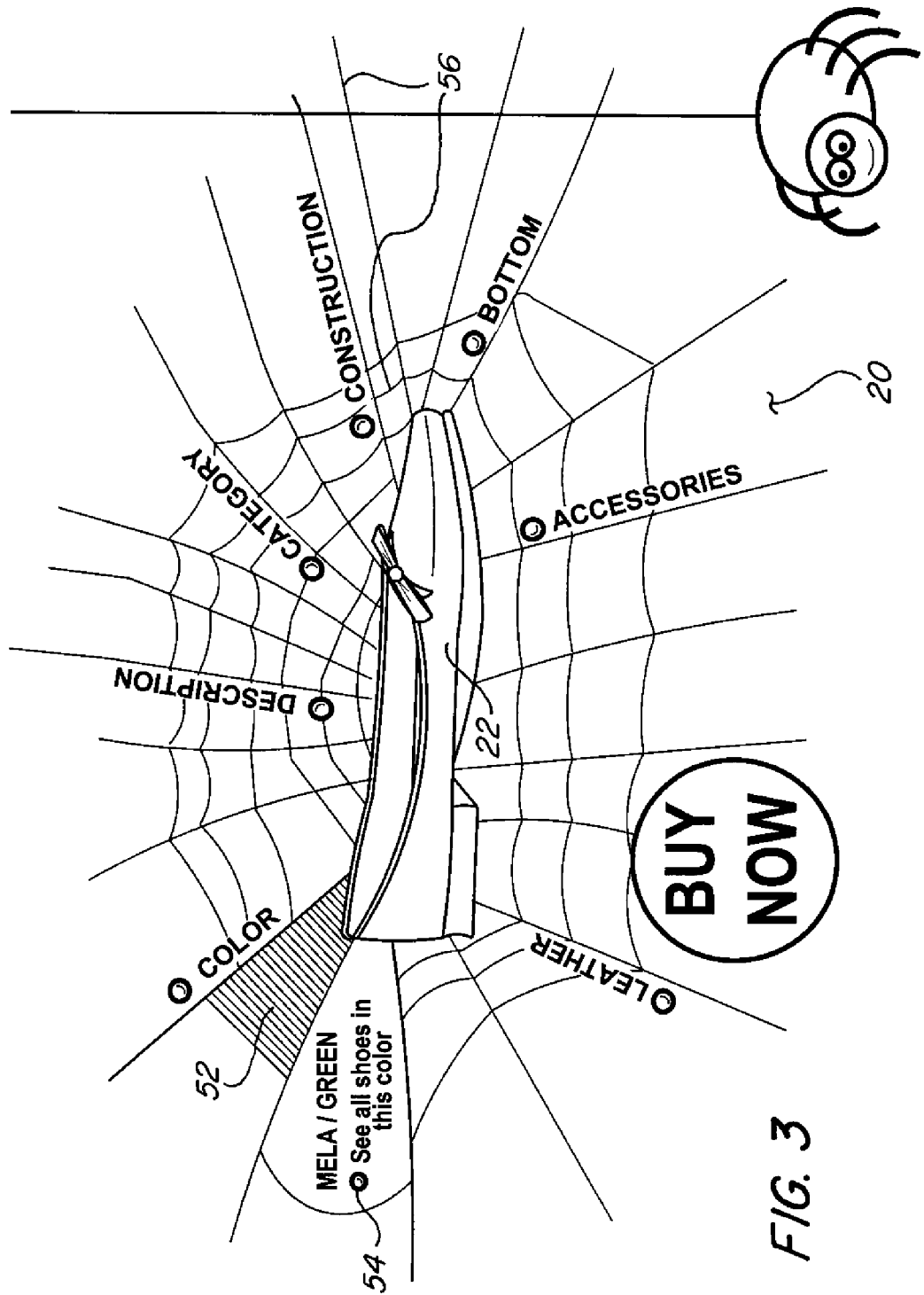
FIG. 3 more particularly depicts the first hyperlink shown in FIG. 2.

As shown in FIG. 3, first hyperlink 43 is actuated and automatically displays sample 52 and menu 54 of other samples. As shown, sample 52 is a close-up of the color of product 22. The close-up view provides a more realistic view of product's 22 actual color so that the user may determine if the color is suitable. In some embodiments, menu 54 includes other products having the same color as sample 52. This is particularly useful if the user likes the color but not product 22 itself, which would allow the user to view other products that may be different from product 22 shown on webpage 20 but is in the same color as product 22.

As shown in FIG. 3, menu 54 is a hyperlink to the other samples or products having the same color as product 22. In some embodiments, menu 54 is a listing of other samples displayed on overlay 56, where the listing is an image of each sample such as a thumbnail listing. In other embodiments, menu 54 is a text listing of other samples. These limitations of menu 54 are applicable to other menus for FIGS. 4-10, where the other menus are listings of images or texts.

Figure 4:
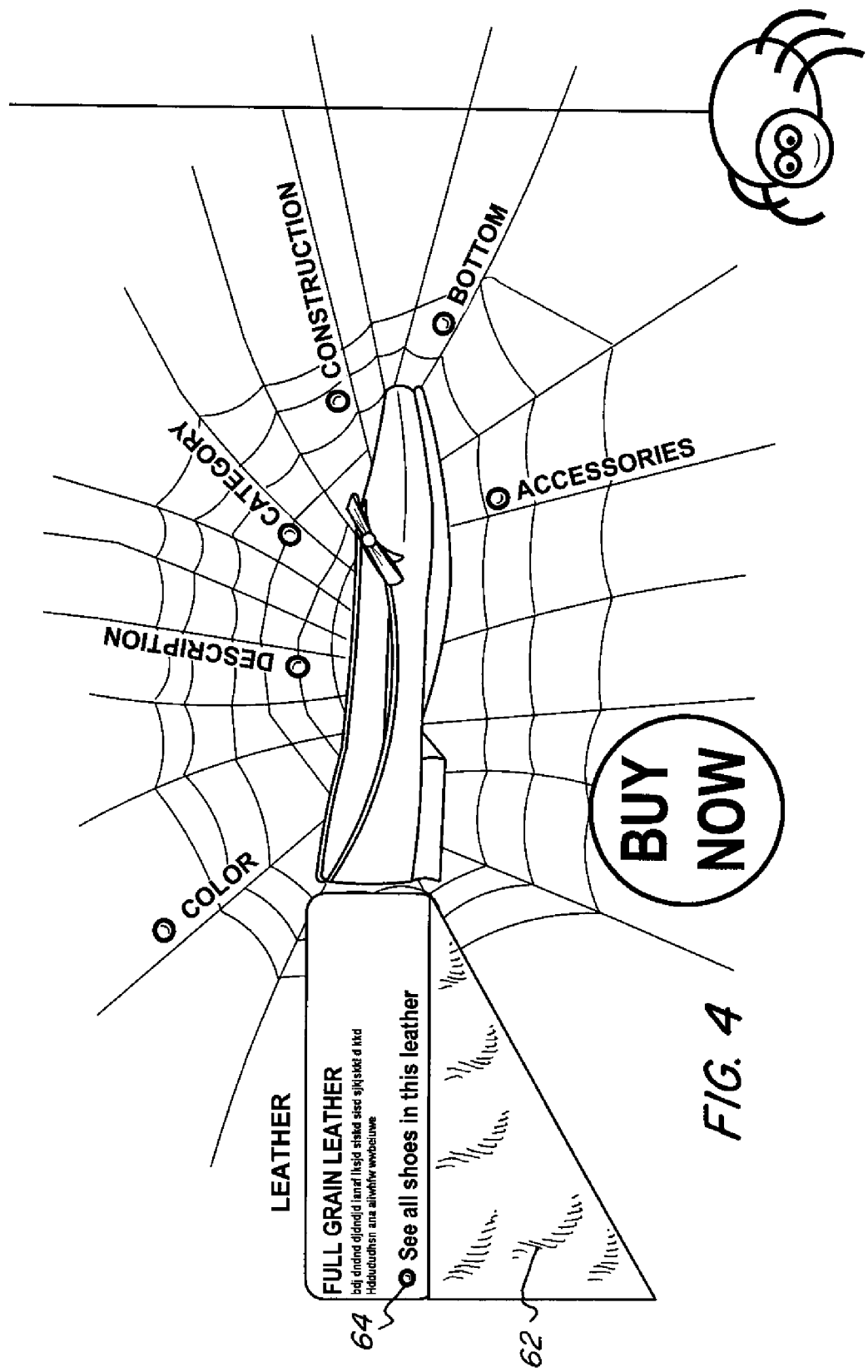
FIG. 4 more particularly depicts the second hyperlink shown in FIG. 2.

As shown in FIG. 4, second hyperlink 44 is actuated and automatically displays sample 62 and menu 64 of other samples. As shown, sample 62 is a close-up of the material of product 22, which is leather. The close-up view provides a more realistic view of product's 22 material and texture so that the user may determine if the material is suitable. In some embodiments, menu 64 includes other products having the same material as sample 62. This is particularly useful if the user likes the material of sample 62, which is the material of product 22, but not product 22 itself, which would allow the user to view other products that may be different from product 22 shown on webpage 20 but having the same material as product 22.

Although all figures show hyperlink 44 as being labeled "leather", other materials may be used, such as vinyl, plastic, canvas, cotton, and any manmade or natural material. In further embodiments, hyperlink 44 is labeled "material".

Figure 5:
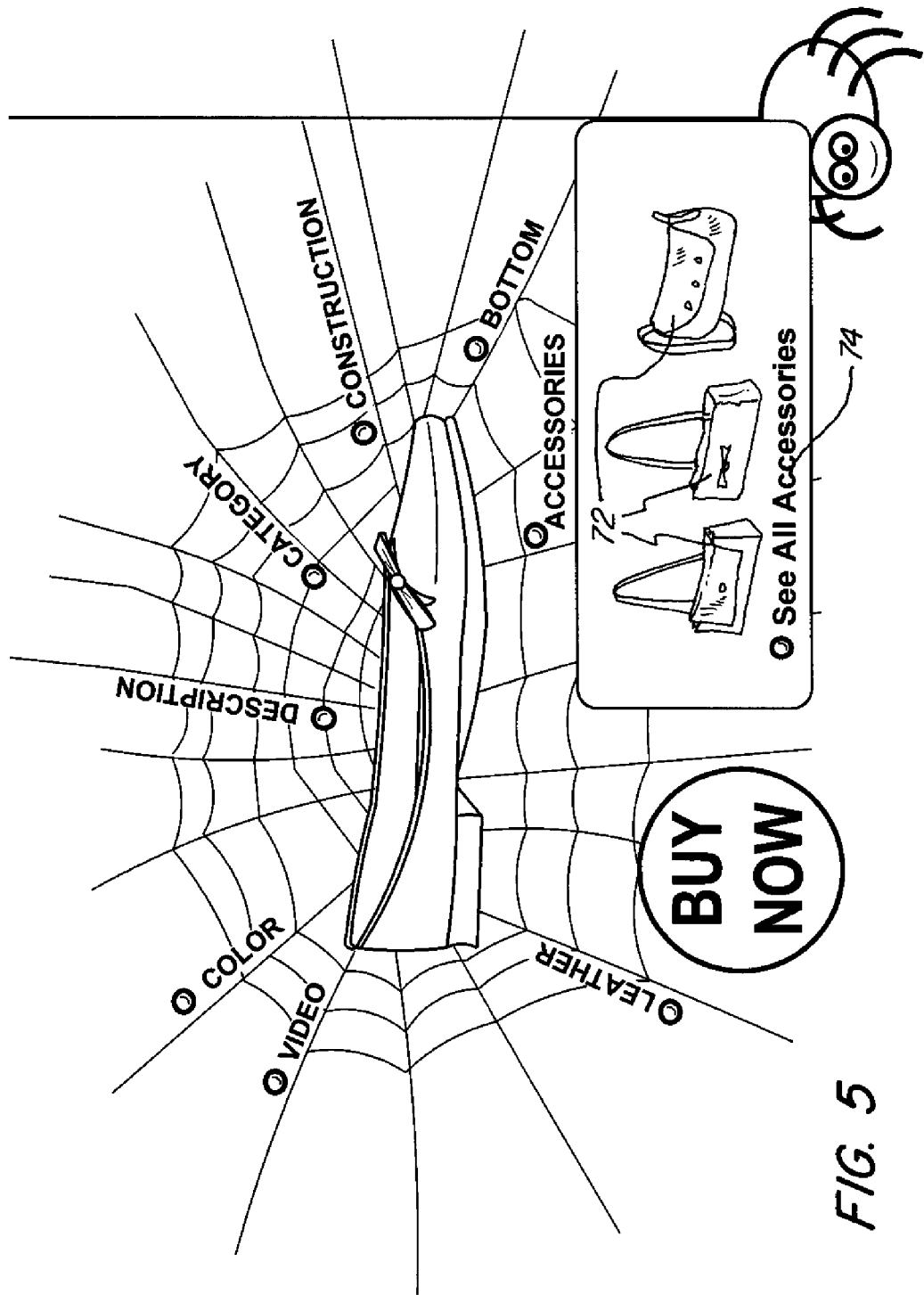
FIG. 5 more particularly depicts the third hyperlink shown in FIG. 2.

As shown in FIG. 5, third hyperlink 45 is actuated and automatically displays sample 72 and menu 74 of other samples. As shown, sample 72 depicts an item that may be used to accessorize product 22. Sample 72 is usually matching product 22 in at least one characteristic, such as color, material, category, construction, and the like in order to complement product 22. Three samples 72 are shown but this is not to be interpreted as a requirement of the invention as any quantity suffices provided there is at least one sample 72. This is true of all other samples shown in FIGS. 3 and 5-10, where a quantity of one is shown as the corresponding sample it should be understood that more than one quantity may be used.

In some embodiments, menu 74 includes other accessories, such as hair clips, wrist bands, hats, bracelets, and the like. Menu 74 is particularly useful if the user likes product 22 but desires additional assistance in determining whether or not product 22 would go with, or match, other clothing or articles that are worn, in which case menu 74 provides a listing of other accessories in addition to sample 72 from which the user may choose or view before deciding to purchase product 22.

Figure 6:
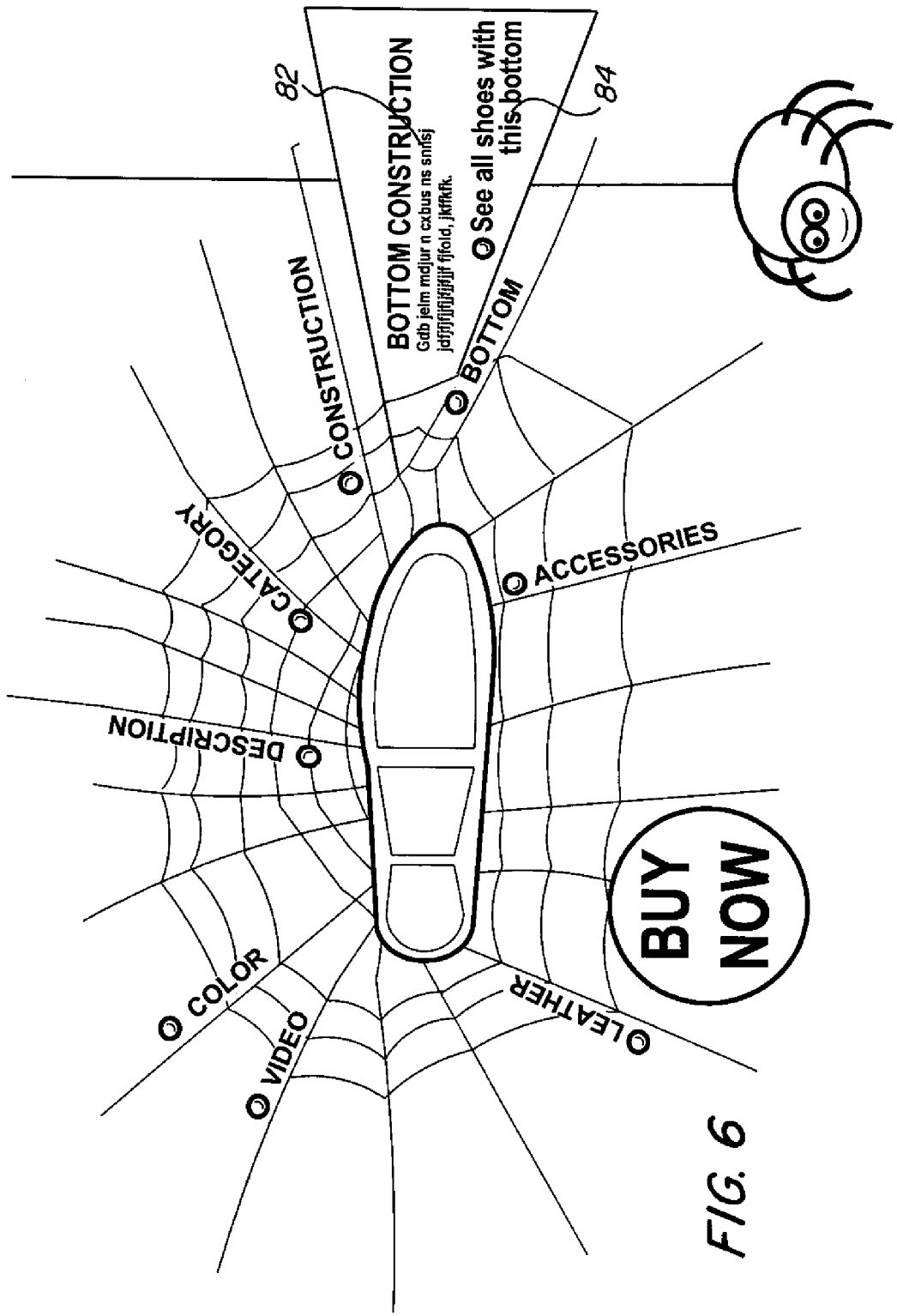
FIG. 6 more particularly depicts the fourth hyperlink shown in FIG. 2.

As shown in FIG. 6, fourth hyperlink 46 is actuated and automatically displays sample 82 and menu 84 of other samples. As shown, sample 82 is a view and description of the texture and appearance of the bottom of product 22 so that the user may determine if the look of product 22 is suitable. In some embodiments, menu 84 includes other products having the same bottom as sample 82. This is particularly useful if the user likes the bottom of product 22, but not product 22 itself, which would allow the user to view other products that may be different from product 22 shown on webpage 20 but having the same bottom as product 22.

Figure 7:
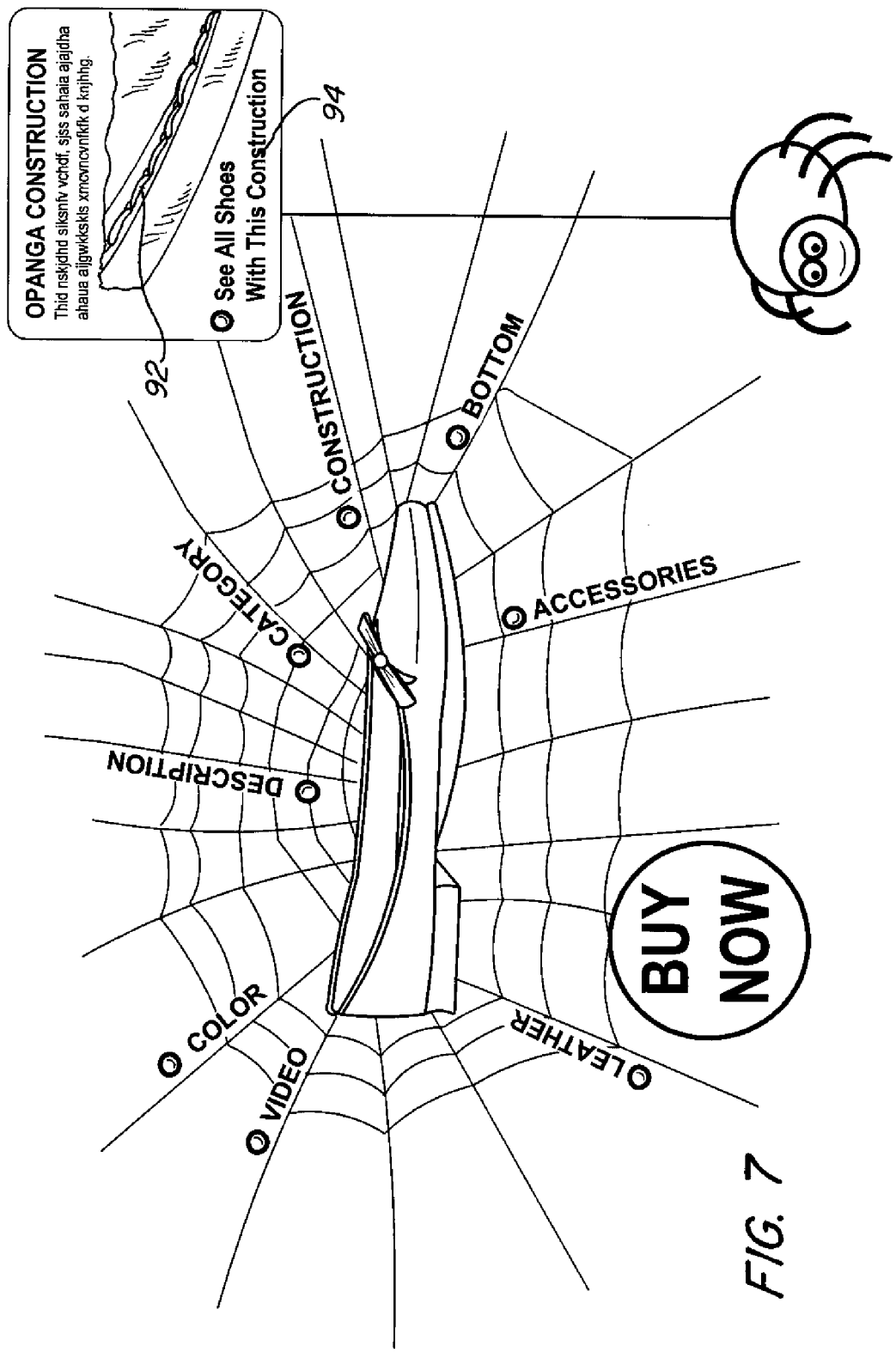
FIG. 7 more particularly depicts the fifth hyperlink shown in FIG. 2.

As shown in FIG. 7, fifth hyperlink 47 is actuated and automatically displays construction 92 and menu 94 of other products having the same construction. As shown, construction 92 is a description of how to provide product 22 as well as an image of the construction of product 22, which is an opanka construction. It is understood that all samples and all menus may include an image, a textual description, or both. As shown, the description includes an image of the construction although it is not a requirement for adequately describing the construction of product 22.

Menu 94 includes a hyperlink to other products having the same construction as product 22. This is particularly useful if the user likes the construction of product 22 but not product 22 itself, which would allow the user to view other products that may be different from product 22 shown on webpage 20 but have the same construction as product 22.

Figure 8:
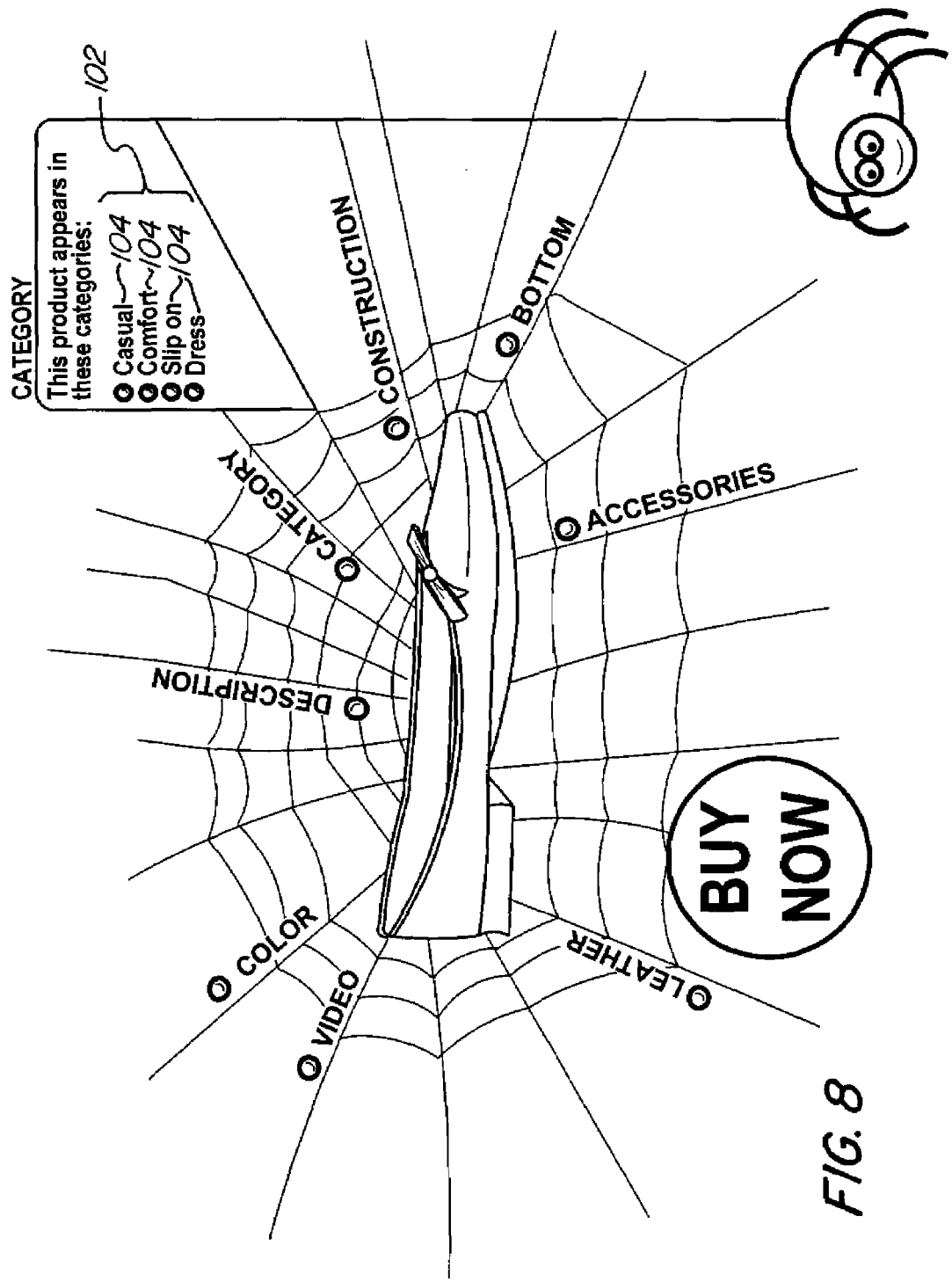
FIG. 8 more particularly depicts the sixth hyperlink shown in FIG. 2.

As shown in FIG. 8, sixth hyperlink 48 is actuated and automatically displays listing 102 of categories to which product 22 belongs, each category 104 being hyperlinked to another listing of other products that belong to that category. This is particularly useful if the user likes a category and wants to view other products belonging to that category, which would allow the user to view other products that may be different from product 22 shown on webpage 20 but belongs in the same category as product 22.

For example, product 22 may belong to the slip on category, which is similar to a sandal classification. In addition to product 22, the user may then view other shoes in the slip on category to view other shoes that are similar in style and look to product 22.

Figure 9:
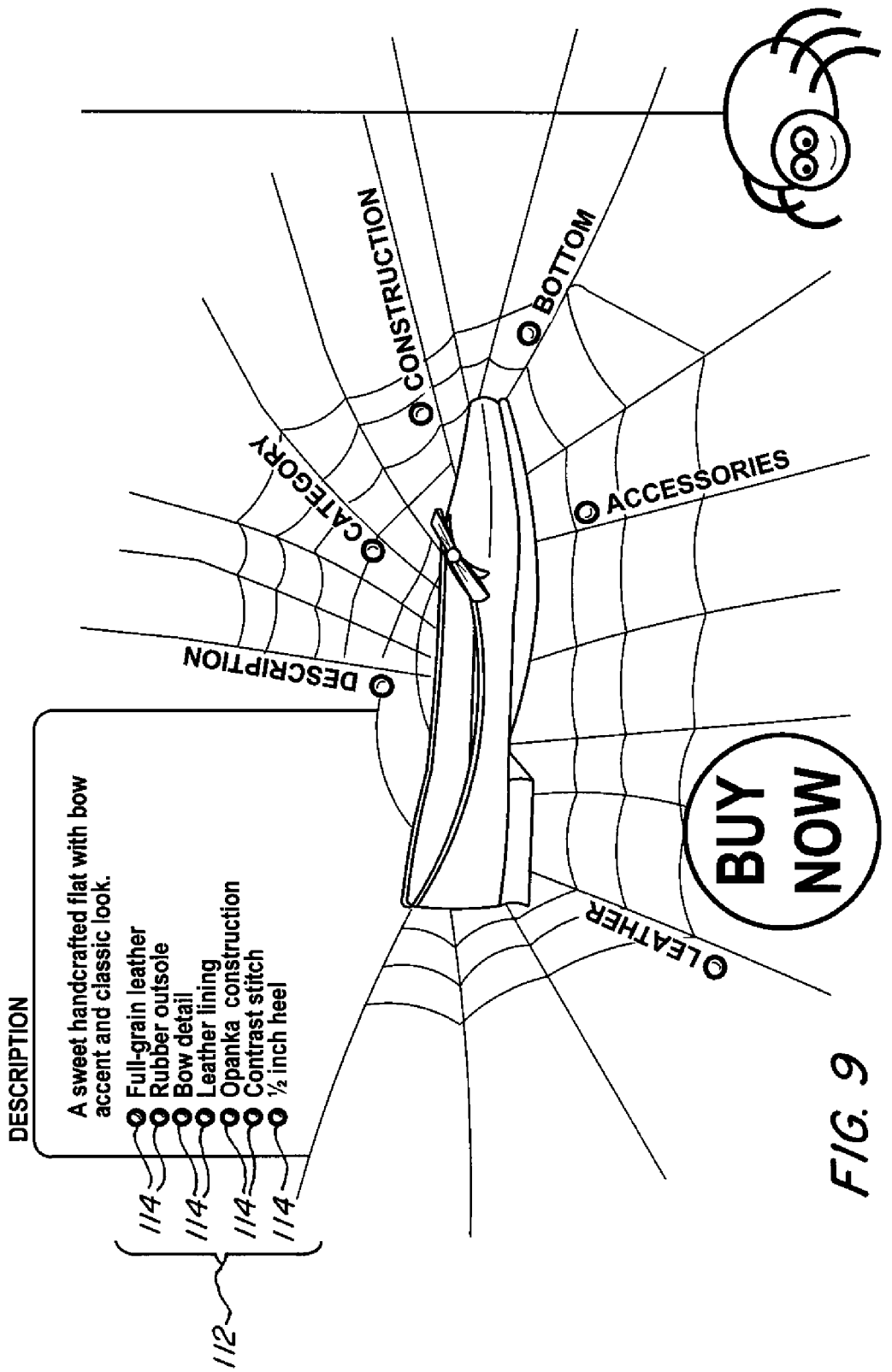
FIG. 9 more particularly depicts the seventh hyperlink shown in FIG. 2.

As shown in FIG. 9, seventh hyperlink 49 is actuated and automatically displays description 112 of product 22, including details of the type of material, height of the heel, and the like. In some embodiments, each feature 114 of description 112 is a hyperlink that, when actuated, displays a listing of other products having the same actuated feature 114. This is particularly useful if the user likes the feature of product 22, but not product 22 itself, which would allow the user to view other products that may be different from product 22 shown on webpage 20 but having the same feature 114 as product 22.

Figure 10:
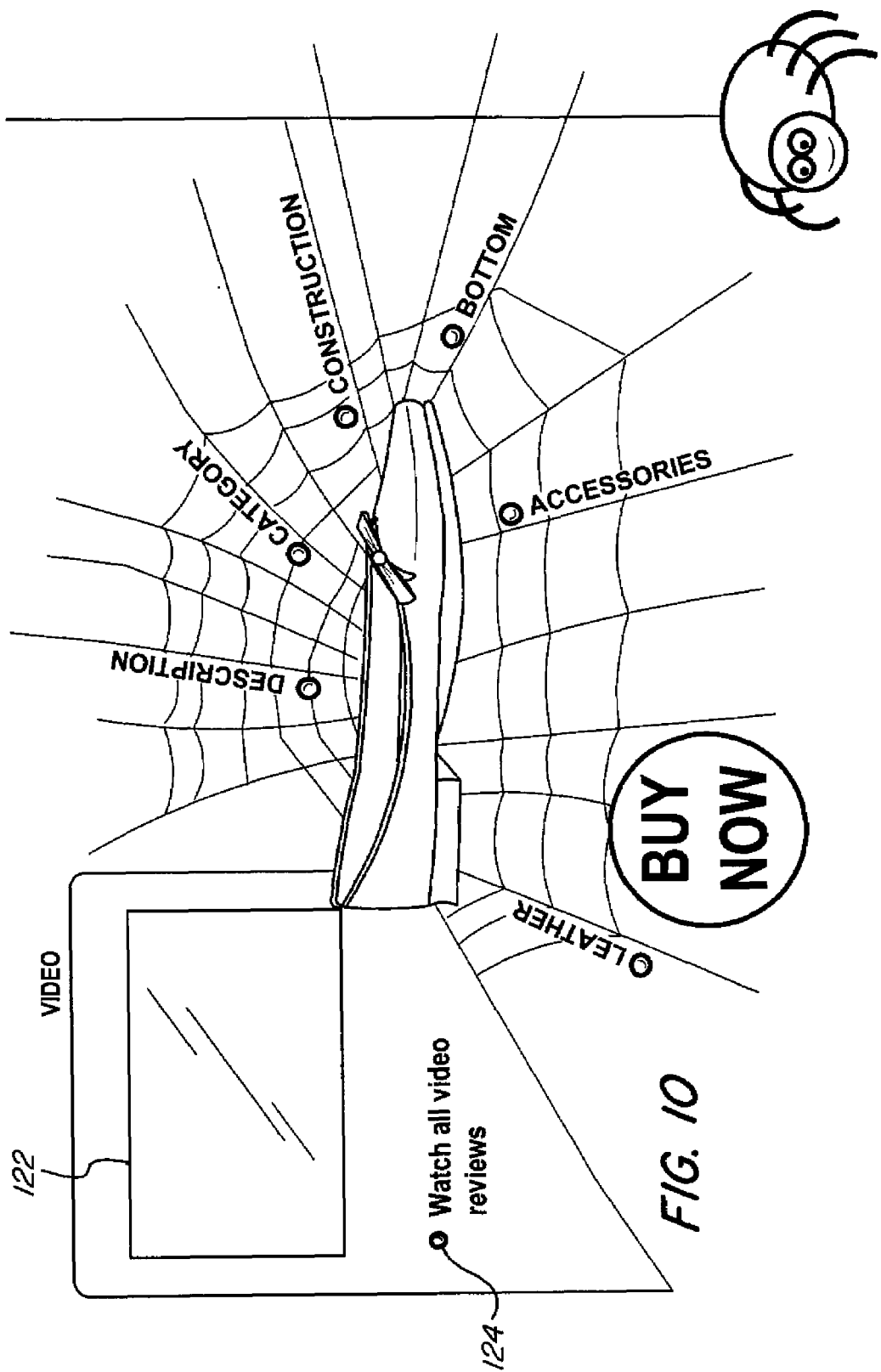
FIG. 10 more particularly depicts the eighth hyperlink shown in FIG. 2.

As shown in FIG. 10, eighth hyperlink 50 is actuated and automatically displays video 122 and menu 124 of other videos. As shown, sample 122 is a movie of product 22, including an animation of the construction, history of product 22, or any other dramatization of product 22. The video may show product 22 from all angles as well as giving information not easily conveyed in text or pictures so that the user may determine if product 22 is suitable. In some embodiments, menu 124 includes videos of other products having similarities as product 22. This is particularly useful if the user likes product 22 but wishes to view videos of other products that are similar to product 22.

Figure 11:
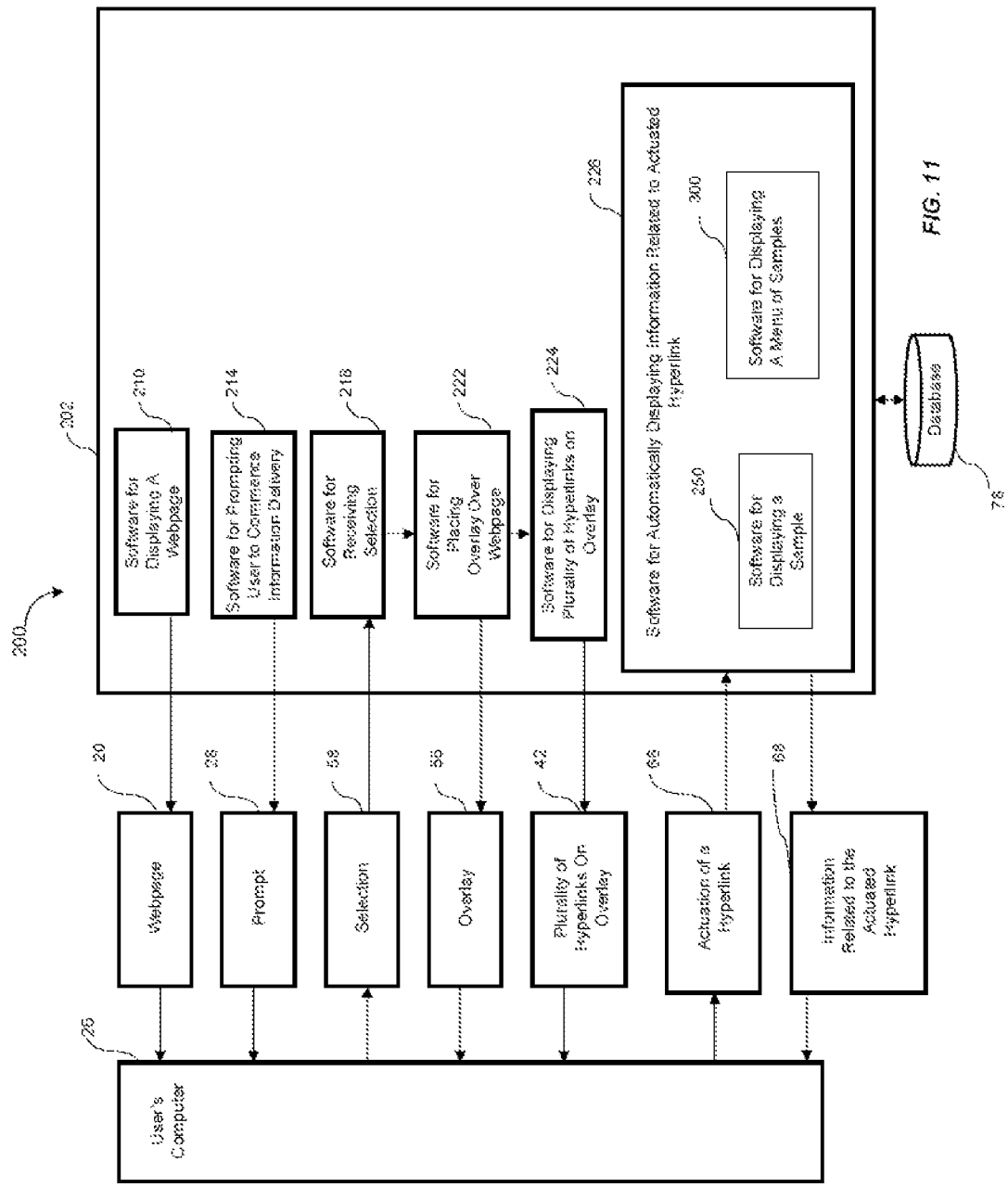
FIG. 11 depicts a flow diagram of the system shown in FIG. 2.

As shown in FIG. 11, system 200 for delivering information related to a product is shown, including computer 202, software 210 for displaying webpage 20 and software 214 for prompting a user to commence information delivery by providing prompt 28 on webpage 20. As shown in FIG. 1, prompt 28 is at least one hyperlink and when selected, launches software 222 for placing overlay 56 over webpage 20.

Prompt 28 indicates to a user that by actuating prompt 28, the user would be directed to further information concerning product 22 on webpage 20. In some embodiments, prompt 28 is a picture such as a spider shown in FIGS. 1-2. In other embodiments, prompt 28 includes text to indicate the type of further information, such as "additional information on this product".

The person viewing webpage 20 would, if interested in viewing the further information, transmit selection 58 from user's computer 26 to actuate prompt 28. Software 218 for receiving selection 58 receives the transmitted selection 58 from user's computer 26 and transmits a signal to software 222 for placing overlay 56 over webpage 20 automatically without user intervention after selection 58 is received. In addition, software 224 for displaying plurality 42 of hyperlinks on overlay 56 places hyperlinks 43-50 on overlay 56.

As shown, overlay 56 is transparent in at least one portion so that webpage 20, as well as product 22, are visible through overlay 56. Even when plurality 42 of hyperlinks is placed on overlay 56, webpage 20 and product 22 are visible in at least one portion.

The user then actuates one of plurality 42 of hyperlinks 43-50 by transmitting actuation 66 of the one hyperlink. Once actuation 66 has been transmitted, system 200 launches software 226 for automatically displaying information 68 related to the actuated hyperlink. As described below under FIGS. 12-13, software 226 for automatically displaying information 68 includes software 250 for displaying a sample and software 300 for displaying a menu of other samples.

A sample is information 68 related to the actuated hyperlink, or actuation 66. More specifically, the information is directed to a characteristic or aspect of product 22. A menu of samples includes characteristics or aspects of product 22. In some embodiments, a menu of samples includes characteristics or aspects of at least a second product.

Database 78 is in communication with computer 202 in the event storage is needed to store webpage 20, any part of system 200, or any of the transmissions from user's computer 26 or from computer 202.

Figure 12:
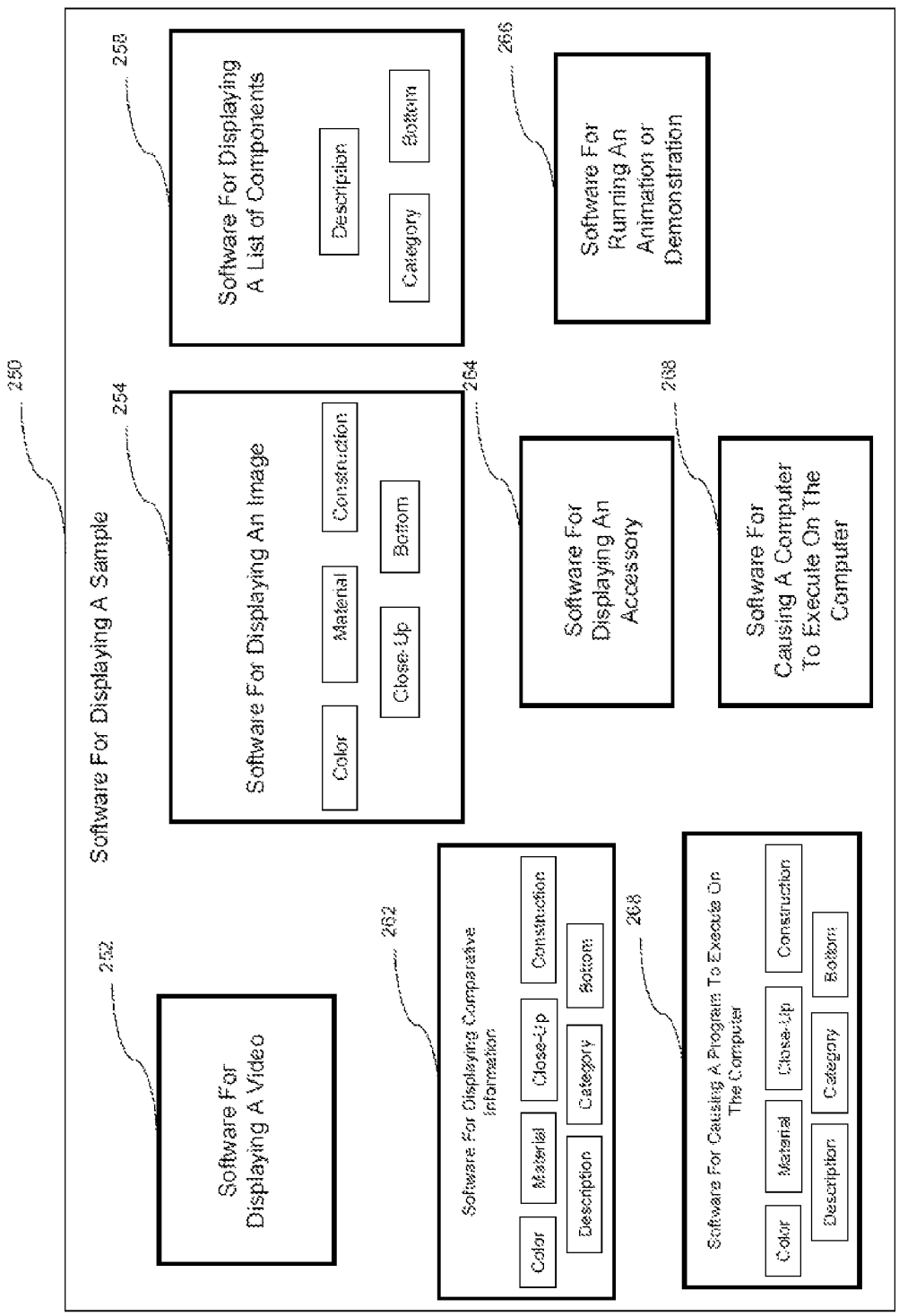
FIG. 12 more particularly depicts the sample displayed in FIG. 2.

Software 250 for displaying a sample is more particularly depicted in FIG. 12 and includes software 252 for displaying a video of the product and software 254 for displaying an image of the product, where the image is of a color, material, construction, close-up, and the like.

Software 250 for displaying a sample also includes software 258 for displaying a list of components and software 262 for displaying comparative information between the product and at least a second product.

In some embodiments, the list of components describes the various items needed to provide the product, such as the type of leather, type of outsole, footbed material, and the like. In other embodiments, the list of components is any description of the product such as a list of categories to which the product belongs, such as dress, casual, sandals, sporting goods, and combinations of these.

In other embodiments, the comparative information includes a side by side comparison of text and/or image of product 22 and at least a second product. The user may wish to compare prices between the product and the at least second product, in which case both prices would appear on overlay 56. In other embodiments, color, description, material, construction, category, and/or bottoms are compared between product 22 and the at least second product.

In some embodiments, software 262 places information concerning product 22 and a competing product directed to any of the above described hyperlinks described in FIGS. 1-10, such as material, accessory, description, construction, bottom view, category, and combinations thereof. In other embodiments, information between product 22 and two or more competing products are displayed.

To enhance sales, software 264 for displaying an accessory is used to show a complementary product that matches or otherwise seems to look as a set with product 22. For example software 264 for displaying an accessory may show a purse, a pair of pants, a blouse, hosiery, scarf, hat, jewelry, or other items that may be worn. In another example, multiple accessories are shown and are collectively known as a sample.

Figure 14A:
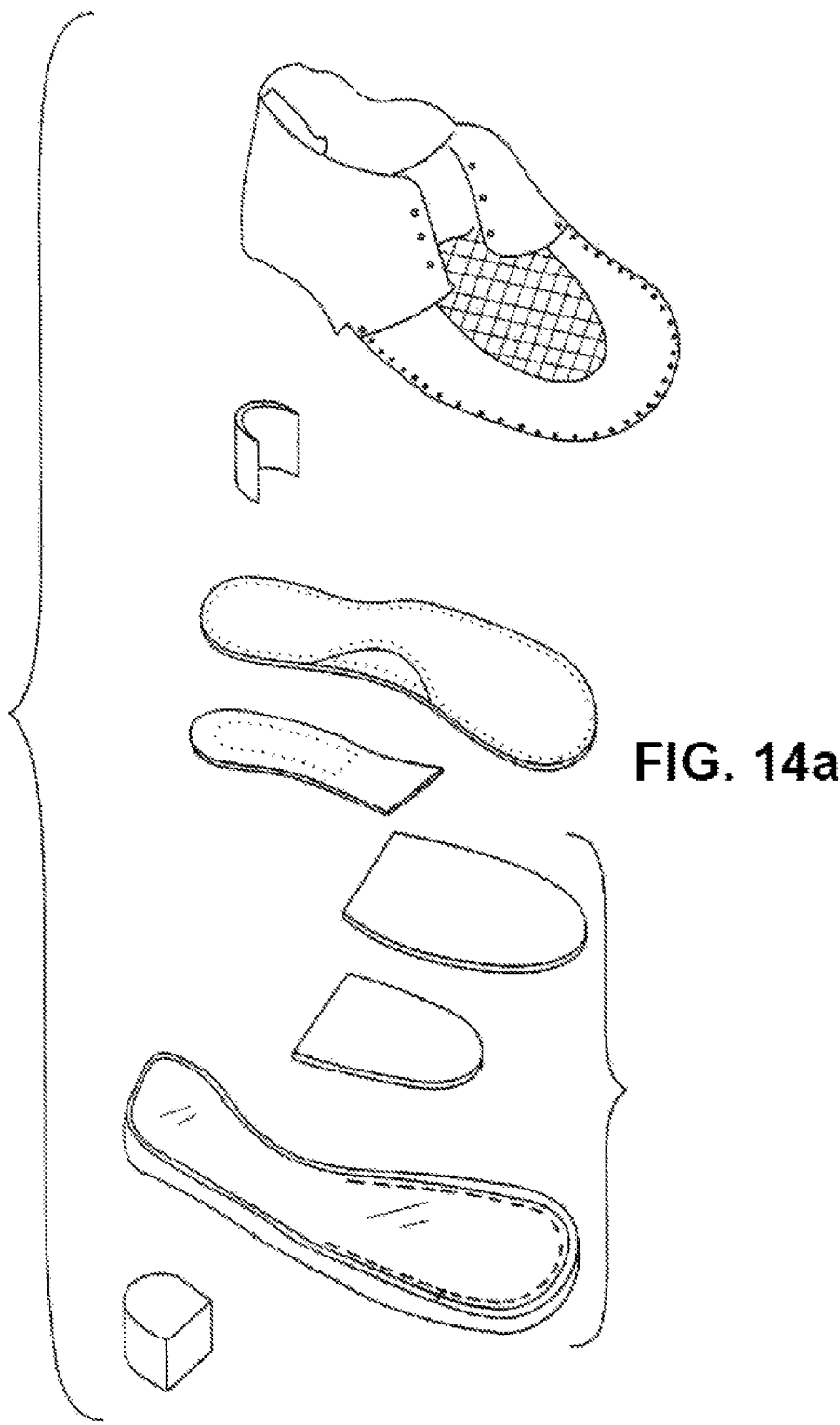
FIGS. 14a-c more particularly depict images of the animation shown in FIG. 2.
Figure 14B:
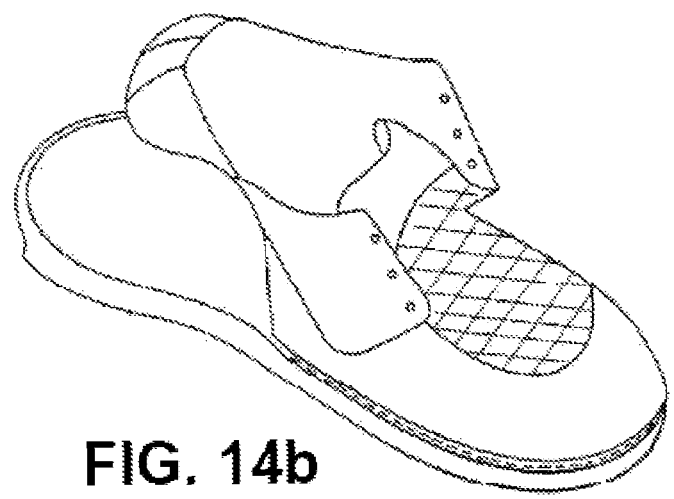
Figure 14C:
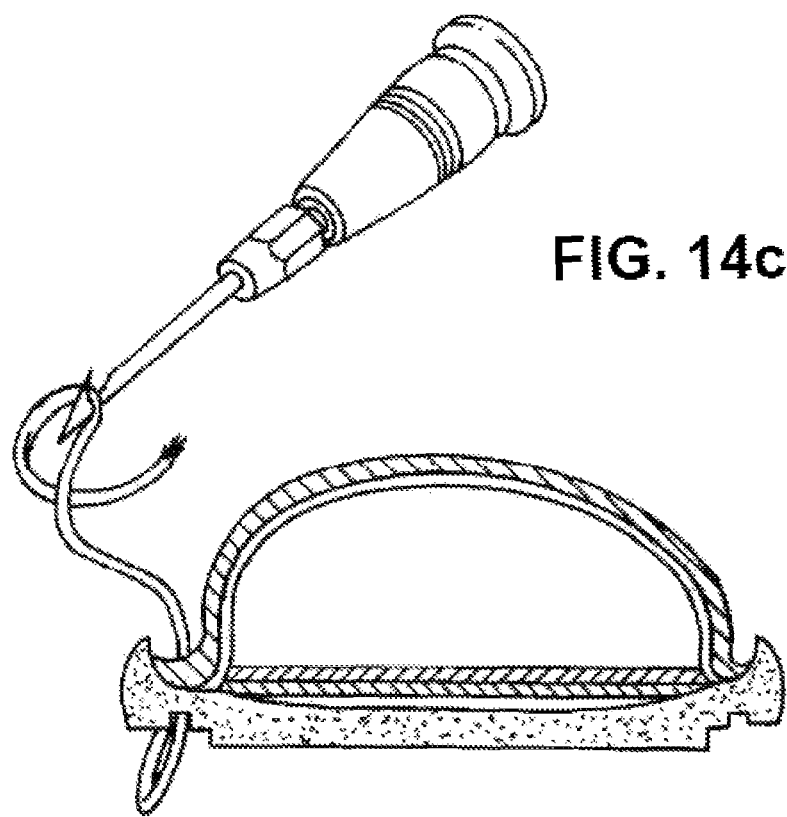

In some embodiments, software 250 for displaying sample also includes software 266 for running an animation or demonstration. Although similar to a video, the animation or demonstration may be more informative since, for example, an animation on construction may show how stitching is interlaced between what layers where the stitch is guided while deleting the mechanisms for holding the stitch and other irrelevant structure are deleted to avoid cluttering the animation. Other animations include how components of a shoe are put together and in what sequence. See FIGS. 14a-c for examples of images taken from various animations.

Figure 15A:
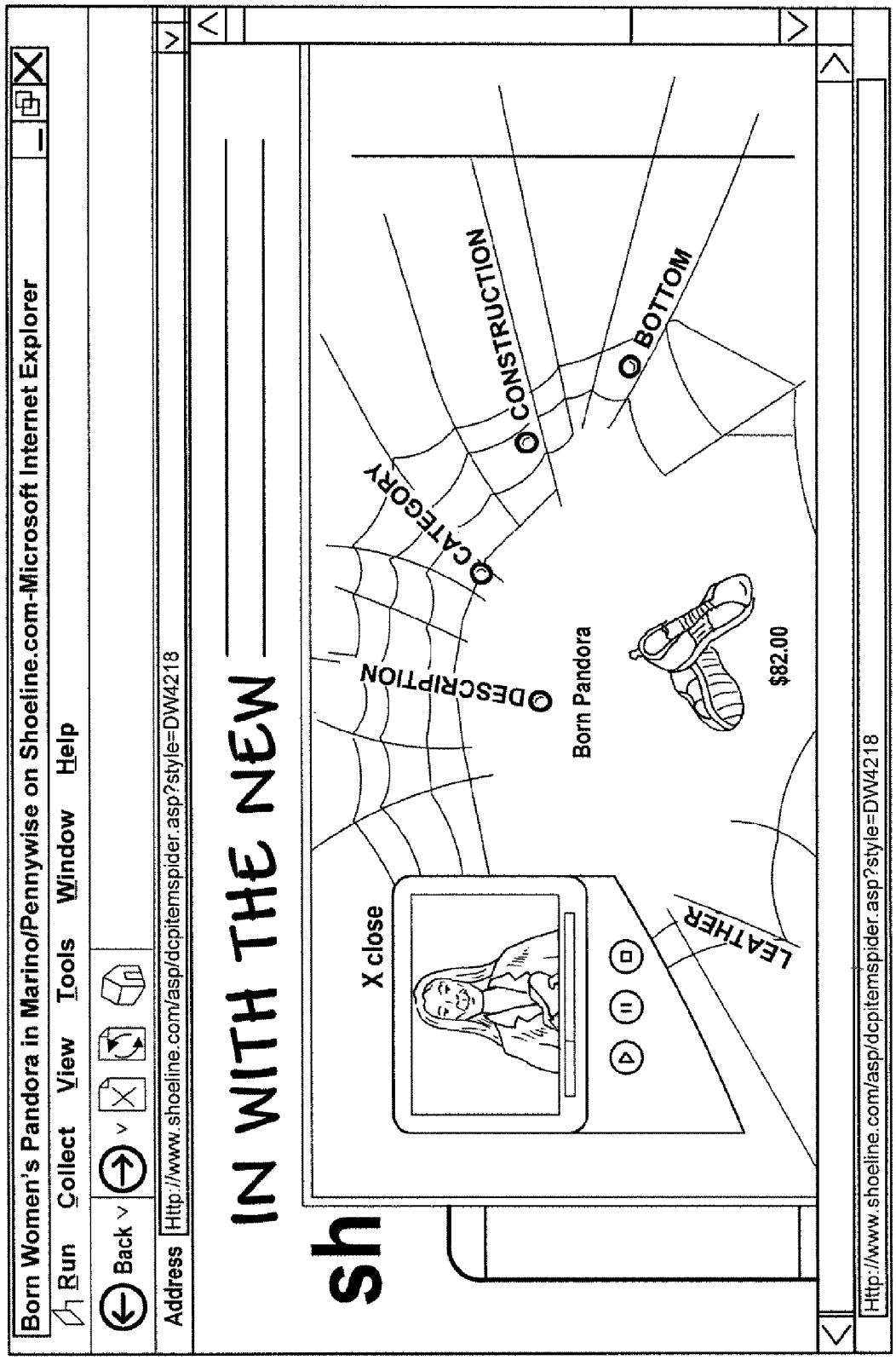
FIGS. 15a-c more particularly depict images of the video shown in FIG. 2.
Figure 15B:
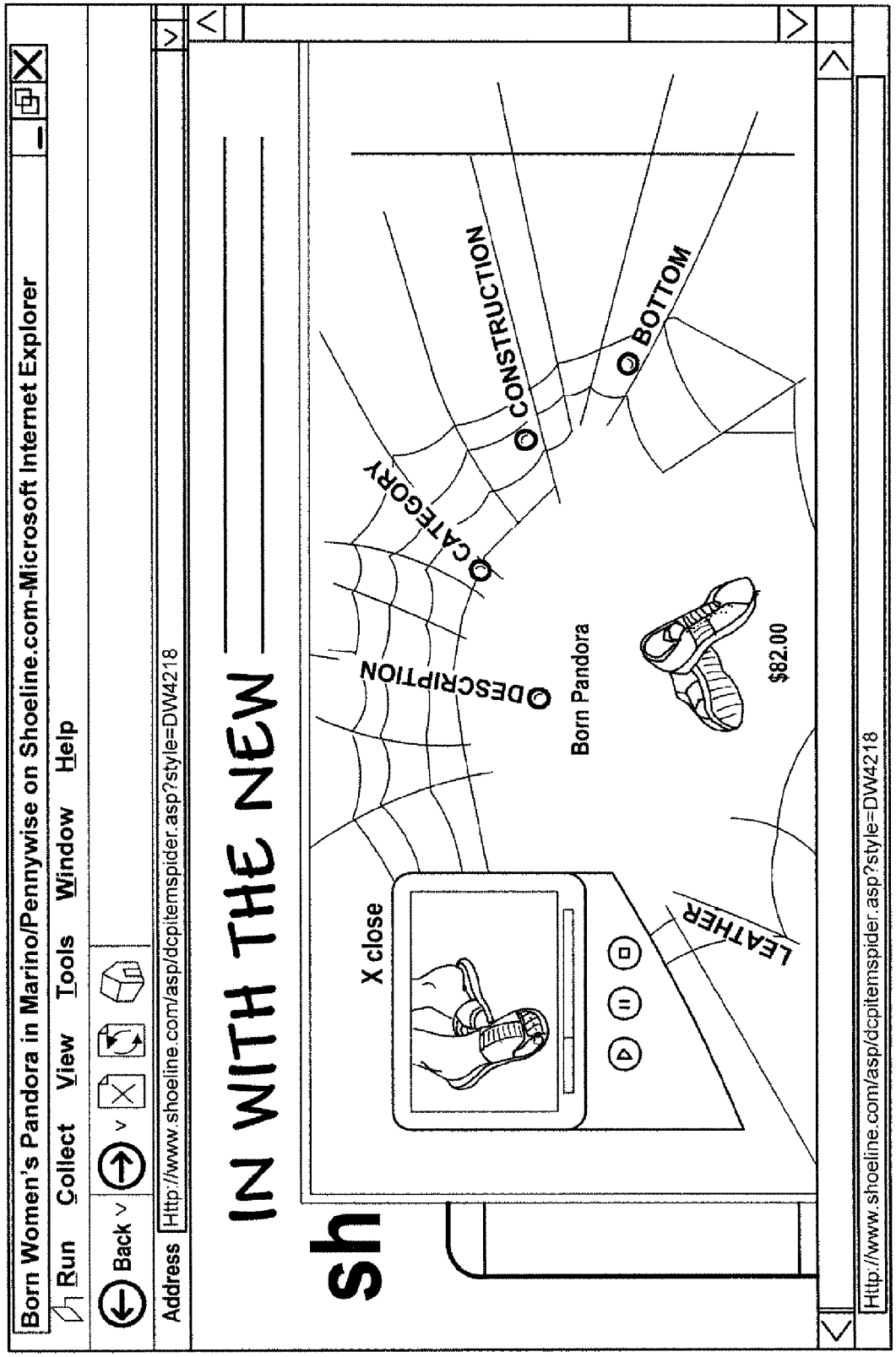
Figure 15C:
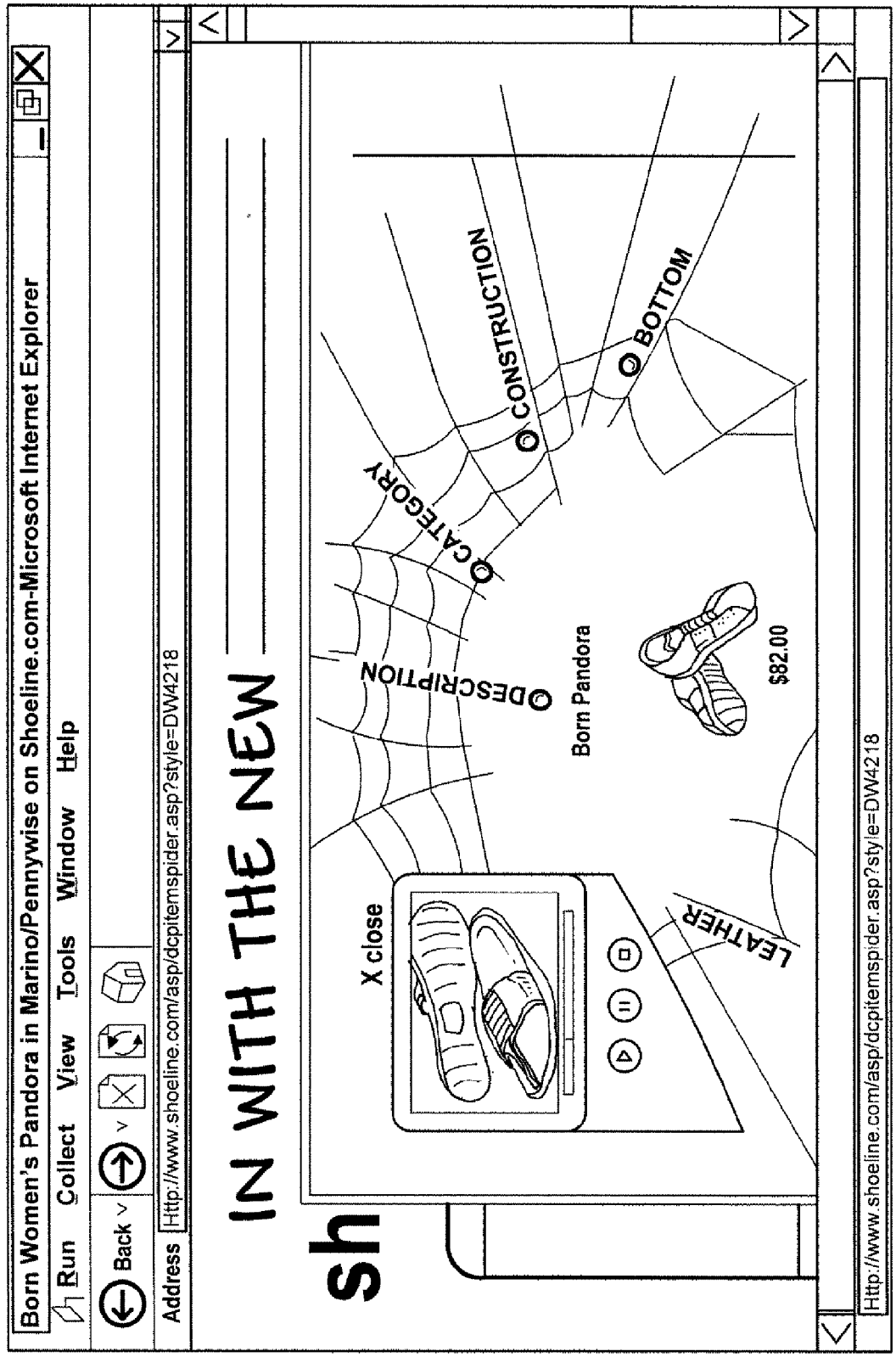

In contrast, a video would often entail showing a human or machine for guiding the stitching and this clutters the video. See FIGS. 15a-c for examples of images taken from various videos. However, a video is more advantageous when realistic images in sequence are desired to be shown, such as a demonstration (FIG. 15b) or when testing is done on product 22. Moreover, actual use of product 22 in the field is typically depicted via video. Further, the video offers audio information, which can explain how product 22 is worn or matched with other clothing (FIGS. 15a and c), such as an accessory or during which seasons or with which colors.

Software 250 for displaying a sample also includes software 268 for causing a program to execute on the computer and, in some embodiments when actuated, includes software for automatically running another program, such as another overlay or a video. In other embodiments, the program that is automatically executed is a software program, such as an excel spreadsheet or power point presentation/slide show.

Figure 13:
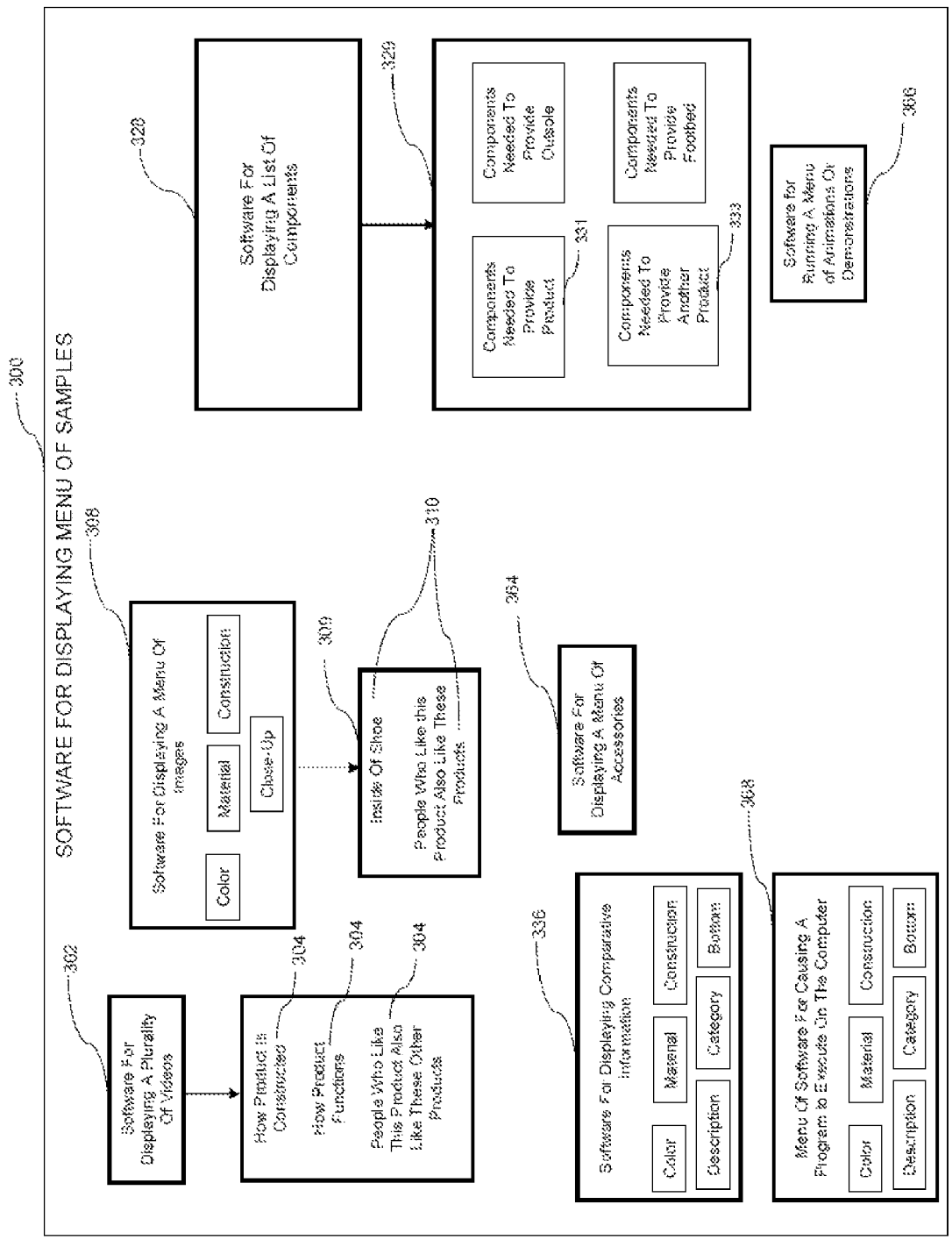
FIG. 13 more particularly depicts the menu of samples displayed in FIG. 2.
Figure 16:
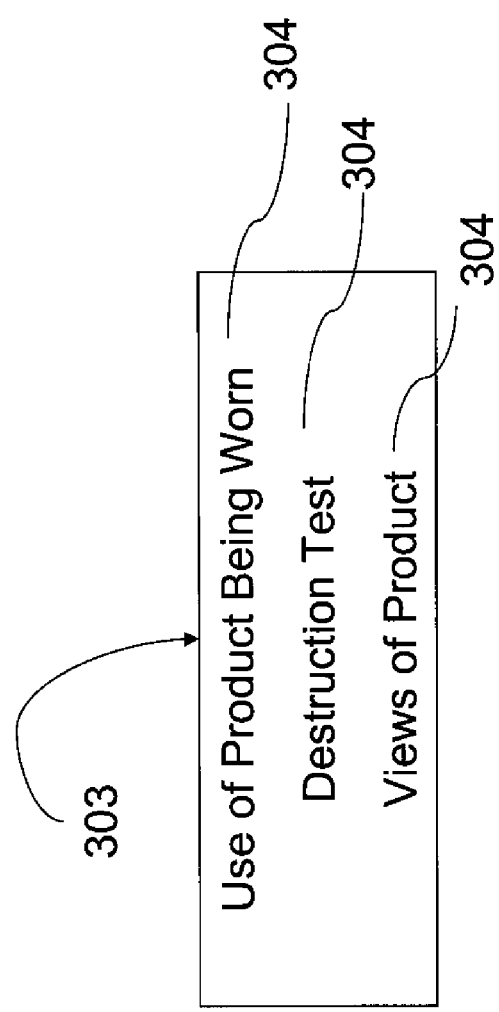
FIGS. 16-18 more particularly depict the menu of samples shown in FIG. 2.

FIG. 13 depicts software 300 for displaying a menu of samples, including software 302 for displaying a plurality of videos. As shown, plurality 303 of hyperlinks 304 of videos are displayed, each when actuated will launch a video of the product indicated by the actuated hyperlink. In some embodiments, each video of plurality of hyperlinks 304 of videos are related to product 22. For example, FIG. 16 shows menu or plurality 303 of hyperlinks 304 that are related to product 22, such as use of product 22 being worn by a user in a sporting event, an actual test of product 22 such as a destruction test, and a 360 degree panoramic view of product 22.

Figure 17:
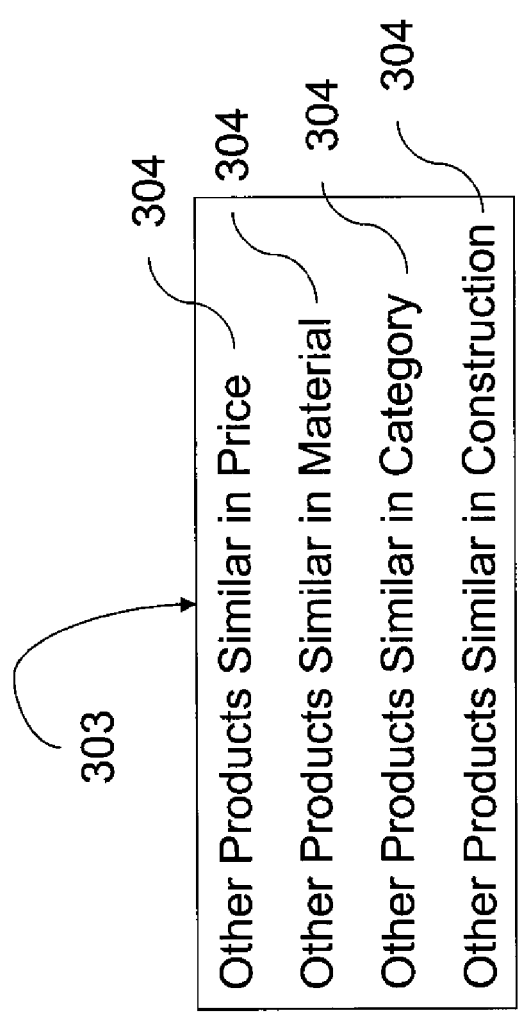

In further embodiments, each video of plurality of hyperlinks 304 of videos are related to products that are similar in look, category, price, or other characteristic to product 22 so that a user may choose from these other products shown in hyperlinks 304 of videos instead of or in addition to product 22. For example, FIG. 17 shows menu or plurality 303 of hyperlinks 304 that a user may select in the event the user is not satisfied or has decided not to purchase product 22. In this effort, system 300 provides menu or plurality 303 of alternative products that may interest the user, which may result in a sale of an alternative product as opposed to no sale at all since the user already lost interest in product 22.

Figure 18:
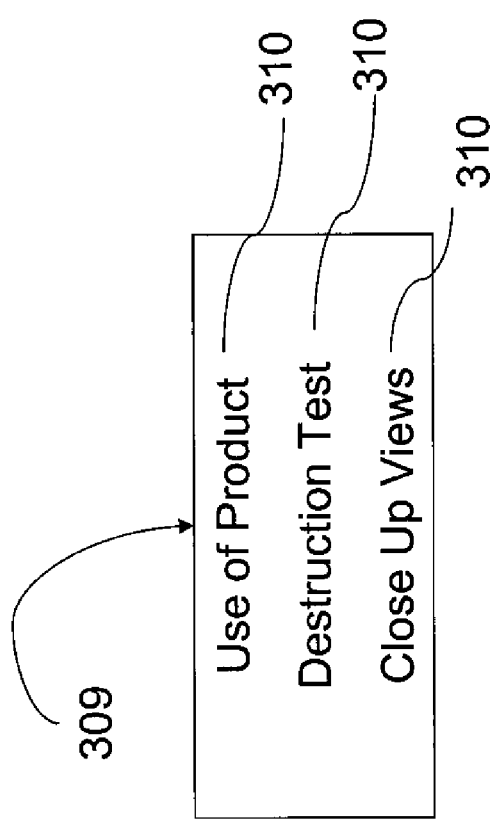

As shown FIG. 13, software 308 for displaying a menu of images includes plurality 309 of hyperlinks 310, each when actuated will launch or automatically display an image of the product indicated by hyperlink 310. In some embodiments, each image of plurality of hyperlinks 310 of images is related to product 22. For example, FIG. 18 shows menu or plurality 309 of hyperlinks 310 that are related to product 22, such as use of product 22 such as being worn by a user in a sporting event, an actual test of product 22 such as a destruction test, and close-up views of product 22.

In further embodiments, each image of plurality of hyperlinks 310 of images are related to products that are similar in look, category, price, or other characteristic to product 22 so that a user may choose from these other products shown in hyperlinks 310 of images instead of or in addition to product 22. In this effort, system 300 provides menu 309 of alternative products that may interest the user, which may result in a sale of alternative product as opposed to no sale at all since the user had previously lost interest in product 22.

As shown in FIG. 13, plurality 309 of images is directed to a color, material, construction, close-up, and combinations thereof. In some embodiments, a user who likes the color of product 22 may choose to see all other products having the same color, in which case menu 309 of images comprises other products having the same color as product 22, where each hyperlink when actuated automatically loads an image of other products.

In other embodiments, a user who likes a material or construction of product 22 may choose to see all other products having the same material or construction, respectively, in which case menu 309 of images comprises other products having the same material or construction as product 22, where each hyperlink when actuated automatically loads an image of another product.

Software 300 for displaying a menu of samples also includes software 328 for displaying menu 329 of lists of components and software 336 for displaying menu 337 of comparative information between product 22 and at least a second product.

In one embodiment, each list of menu of lists of components is directed to the various items needed to provide product 22. For example, first list 331 is directed to the components needed to provide the outsole, the components of the various materials for product 22, and the like.

In another embodiment, second list 333 is directed to components needed to provide another product in addition to or instead of product 22, where the user may determine the make up of various products and possibly compare them with product 22.

For all embodiments, each menu of lists of components can also be directed to categories to which the products belong, such as dress, casual, sandals, sporting goods, and combinations of these. In this effort, the menu of lists of components can be used for comparative purposes. In further embodiments, the comparative information or each list of menu of lists of components are directed to images, prices, colors, constructions, bottoms, and the like.

For the above embodiments, the comparative information, videos, images, and the like are placed on overlay 56 where at least one portion of overlay 56 is transparent so that webpage 20 is visible through overlay 56 in at least one portion of overlay 56. Overlay 56 is transparent if a part of webpage 20 is discernable when overlay 56 is placed over webpage 20.

It is understood that comparative information concerning a product and at least second product, which is a competing product, is directed to any of the above described hyperlinks described in FIGS. 1-13, such as a comparison between materials, accessories, descriptions, constructions, bottom views, categories, and combinations thereof where information of product 22 is placed in close proximity to information of the at least second product. Although it is preferred to have all information on overlay 56 so that the user need not alter between webpages, this is not required for the invention to function properly. Alternatively, the information of product 22 is placed on a different webpage than the information of the at least second product. In other embodiments, information between product 22 and two or more competing products are displayed.

To enhance sales, software 364 for displaying a menu of accessories is used to show a plurality of complementary products that match or otherwise seem to look as a set with product 22. For example software 364 for displaying a menu may show a purse, a pair of pants, a blouse, hosiery, scarf, hat, and jewelry, where each is hyperlinked and, upon actuation, system 200 would automatically display all accessories directed to the actuated hyperlink. For example, if purse is actuated, all purses are displayed on overlay 56.

Software 300 for displaying a menu of samples also includes software 366 for running a menu of animations or demonstrations. Although similar to a video, the animation or demonstration may be more informative since, for example, an animation on construction may show how stitching is interlaced between what layers where the stitch is guided while deleting the mechanisms for holding the stitch and other irrelevant structure are deleted to avoid cluttering the animation. See FIG. 14 for an example of an image taken from an animation.

In contrast, a video would often entail showing a human or machine for guiding the stitching and this clutters the video. See FIG. 15 for an example of an image taken from a video.

Software 300 for displaying a menu of samples also includes software 368 for causing a program to execute on the computer and, in some embodiments when actuated, includes software for automatically running another program, such as another overlay on webpage 20 or a video. In other embodiments, the program that is automatically executed is for placing a second overlay 56 on webpage 20 or for developing webpage 20. In further embodiments, the program that is automatically executed is for running a software program, such as an excel spreadsheet.

Figure 19:
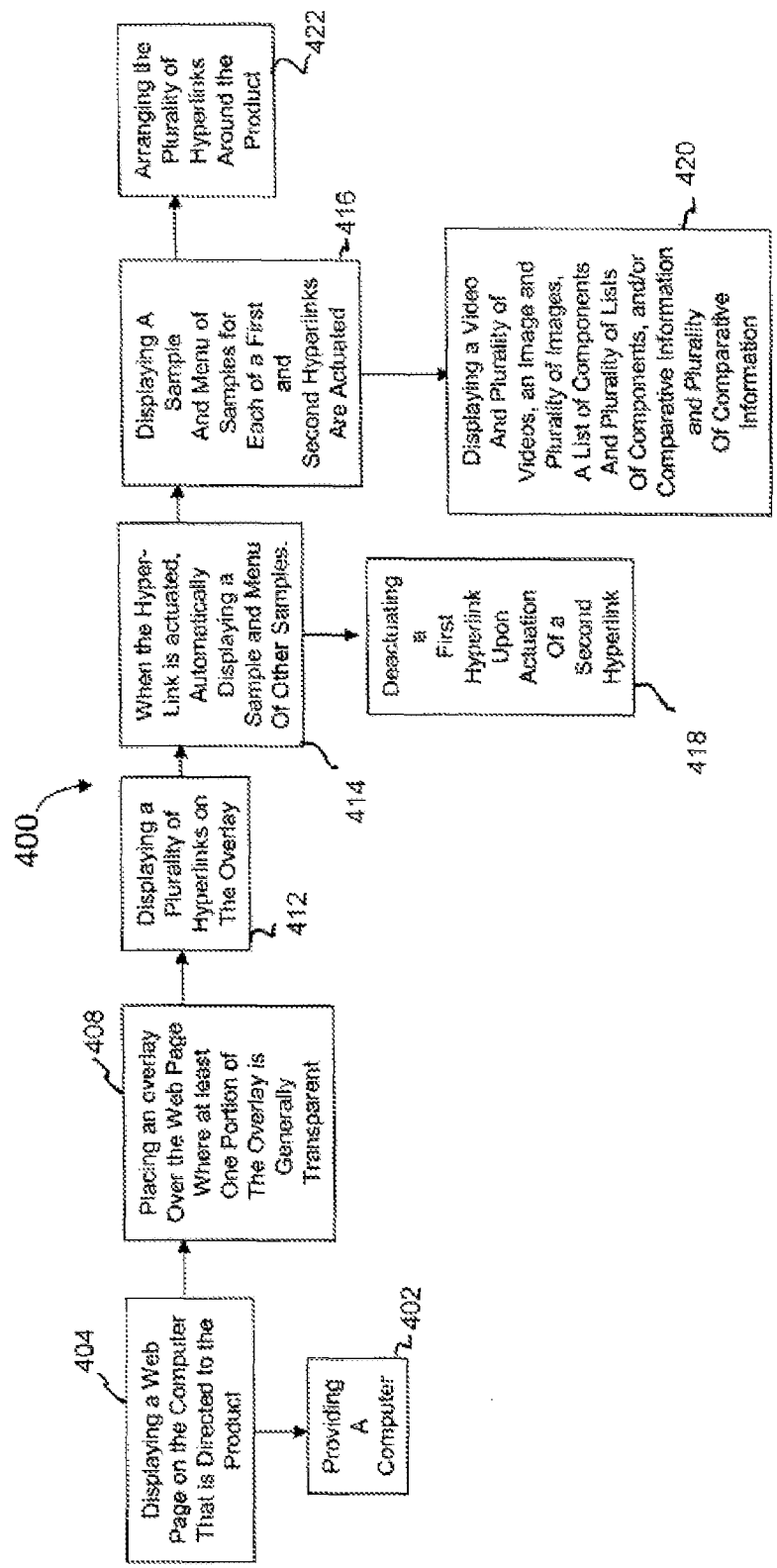
FIG. 19 depicts a method of providing the system shown in FIG. 2.

FIG. 19 depicts method 400 for delivering information related to product 22, including providing 402 a computer, displaying 404 a webpage on the computer that is directed to the product, and placing 408 an overlay over the webpage where at least one portion of the overlay is generally transparent.

Method 400 also includes the step of displaying 412 a plurality of hyperlinks on the overlay, each hyperlink representing a different characteristic of product 22. In a further embodiment, each hyperlink represents a characteristic of a different product, such as one hyperlink or characteristic being related to one product and a next hyperlink or characteristic being related to another product. When a hyperlink is actuated method 400 automatically displays 414 a sample and menu of other samples related to the actuated hyperlink.

In some embodiments, method 400 also includes displaying 416 a second sample and menu of other samples when a second hyperlink is actuated, meaning first and second hyperlinks are actuated and a sample and menu of samples associated with each actuated hyperlink are displayed simultaneously or contemporaneously.

In other embodiments, method 400 deactivates or deactuates 418 the first hyperlink automatically upon actuation of a second hyperlink, meaning the sample of and menu of other samples associated with the first hyperlink are closed, or no longer displayed, when the second hyperlink is actuated and where the sample and menu of samples associated with the second hyperlink are displayed.

More specifically, the sample and menu of samples includes method 400 displaying 420 a video and plurality of videos, an image and plurality of images, a list of components and plurality of lists of components, and/or comparative information and a plurality of comparative information. To facilitate selection and viewing, method 400 arranges 422 the plurality of hyperlinks around the product.

What is claimed is:

1. A system for delivering information related to a product, comprising:
   a computer;
   a webpage displayed on said computer that is directed to the product;
   a program executing on said computer for placing an overlay over said webpage where at least one portion of the overlay is generally transparent;
   a prompt provided on said webpage for activating said overlay, said prompt being selectable by a user;
   a program executing on said computer for displaying a plurality of hyperlinks on the overlay, each hyperlink indicating a different characteristic of the product;
   a program executing on said computer for, when a hyperlink is actuated, automatically opening a window within the overlay where both a sample and a menu of other samples are displayed in the window, wherein the sample and menu are directed to the characteristic of the actuated hyperlink; and
   when the sample or menu is actuated, automatically displaying additional information of the sample or menu selected from the group consisting of an image, a video, a list of components, comparative information, and combinations thereof; and
   wherein said plurality of hyperlinks is disposed around a periphery of said product.

2. The system according to claim 1, wherein the sample is a video of the product and the menu of samples is a plurality of videos of other products.

3. The system according to claim 1, wherein the sample is an image of the product and the menu of samples is a plurality of images of other products.

4. The system according to claim 3, wherein the image is selected from the group consisting of a texture, close-up, an accessory, a bottom view, a color, a construction, and combinations thereof.

5. The system according to claim 1, wherein the sample is a list of components and the menu of samples is a plurality of lists of components.

6. The system according to claim 1, wherein the sample is an accessory and the menu of samples is a plurality of accessories.

7. The system according to claim 1, wherein the sample is a process of construction of the product and the menu of samples is a plurality of processes of constructions of other products.

8. The system according to claim 1, wherein the sample is a category of the product and the menu of samples is a plurality of categories of other products.

9. The system according to claim 1, wherein the sample is comparative information of the product and at least a second product and the menu of samples is comparative information of a plurality of other products.

10. The system according to claim 1, further comprising:
a program executing on said computer for, when at least a first hyperlink is actuated, displaying a video and a menu of other videos;
a program executing on said computer for, when at least a second hyperlink is actuated, displaying an image and a menu of other images; and
a program executing on said computer for, when at least a third hyperlink is actuated, displaying comparative information and a menu of other comparative information.

11. The system according to claim 1, wherein said overlay comprises a visual representation of the product and further comprising a program executing on said computer for, when a hyperlink is actuated, automatically displaying information related to the characteristic of the actuated hyperlink within the overlay proximate to a remainder of the plurality of the hyperlinks and covering at least a portion of said visual representation of the product.

12. The system according to claim 11, wherein the characteristic is based on a type of material, a type of construction, a color, a use, and combinations thereof.

13. The system according to claim 11, wherein one of a plurality of hyperlinks, when actuated, launches a second program that executes on said computer for placing a second overlay over said webpage.

14. The system according to claim 11, wherein one of a plurality of hyperlinks, when actuated, automatically plays a video.

15. The system according to claim 11, further comprising a program for automatically displaying, when one of a plurality of hyperlinks is actuated, a demonstration of how the product is provided.

16. A system for delivering information related to a product, comprising:
a computer;
a webpage displayed on said computer that is directed to the product;
a program executing on said computer for placing an overlay over said webpage where at least one portion of the overlay is generally transparent;
a prompt provided on said webpage for activating said overlay, said prompt being selectable by a user;
a program executing on said computer for displaying a plurality of hyperlinks related to the product on the overlay;
a program executing on said computer for, when at least a first hyperlink is actuated, automatically opening a window within said overlay covering at least a portion of said product and displaying a video related to said product and a menu of other videos related to said product in the window;
a program executing on said computer for, when at least a second hyperlink is actuated, automatically opening a window within said overlay covering at least a portion of said product and displaying an image related to said product and a menu of other images related to said product in the window; and
a program executing on said computer for, when at least a third hyperlink is actuated, automatically opening a window within said overlay covering at least a portion of said product and displaying comparative information related to said product and a menu of other comparative information related to said product in the window;
wherein said plurality of hyperlinks is disposed around a periphery of said product.

17. The system according to claim 16, wherein actuating the menu of videos prompts a program to execute on the computer for automatically listing a plurality of videos from which a user may select.

18. A method for delivering information related to a product, comprising the steps of:
providing a computer;
displaying a webpage on the computer that is directed to the product;
providing a prompt on said webpage selectable by a user;
placing an overlay over the webpage when said prompt is selected by the user, where at least one portion of the overlay is generally transparent such that the webpage is visible through the at least one portion of the overlay;
displaying a plurality of hyperlinks on the overlay, each hyperlink indicating a different characteristic of the product;
disposing said plurality of hyperlinks around a periphery of said product;
when a hyperlink is actuated, automatically opening a window within said overlay where both a sample and a menu of other samples are displayed on the overlay, wherein the sample and menu are directed to the characteristic of the actuated hyperlink; and
when the sample or menu is actuated, automatically displaying additional information of the sample or menu selected from the group consisting of an image, a video, a list of components, comparative information, and combinations thereof.

19. The method according to claim 18, further comprising the step of deactuating a first hyperlink upon actuation of a second hyperlink.

20. The method according to claim 18, further comprising the steps of displaying a sample and menu of other samples of a first characteristic and displaying a sample and menu of other samples of a second characteristic when a first hyperlink and a second hyperlink are actuated.

21. The method according to claim 18, further comprising the steps of displaying a list of components and displaying a plurality of lists of components.

22. The method according to claim 18, further comprising the steps of:
when at least a first hyperlink is actuated, displaying a video and a plurality of videos of other products;
when at least a second hyperlink is actuated, displaying an image and a plurality of images of other products; and
when at least a third hyperlink is actuated, displaying comparative information and a plurality of comparative information of other products.

23. The method according to claim 18, further comprising the step of automatically displaying information related to the characteristic of the actuated hyperlink on the overlay proximate to a remainder of the plurality of the hyperlinks.

24. The method according to claim 18, further comprising the step of arranging the plurality of hyperlinks around the product for permitting multiple displayed samples and menus of samples to be simultaneously opened.

* * * * *